United States Patent
Edler

(10) Patent No.: US 9,784,356 B2
(45) Date of Patent: Oct. 10, 2017

(54) LIMITED-SLIP DRIVELINE APPARATUS

(71) Applicant: EATON CORPORATION, Cleveland, OH (US)

(72) Inventor: Andrew N. Edler, Homer, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 15/050,712

(22) Filed: Feb. 23, 2016

(65) Prior Publication Data
US 2016/0169359 A1 Jun. 16, 2016

Related U.S. Application Data

(63) Continuation of application No. PCT/US2014/052298, filed on Aug. 22, 2014.
(Continued)

(51) Int. Cl.
| | |
|---|---|
| *F16H 48/32* | (2012.01) |
| *F16H 48/26* | (2006.01) |
| *F16H 61/02* | (2006.01) |
| *F16H 61/06* | (2006.01) |
| *F16H 48/34* | (2012.01) |
| *F16H 48/20* | (2012.01) |

(52) U.S. Cl.
CPC ............ *F16H 48/32* (2013.01); *F16H 48/26* (2013.01); *F16H 61/029* (2013.01); *F16H 61/068* (2013.01); *F16H 2048/204* (2013.01); *F16H 2048/343* (2013.01)

(58) Field of Classification Search
None
See application file for complete search history.

(56) References Cited

U.S. PATENT DOCUMENTS 4,445,400 A 5/1984 Sullivan et al.
4,679,463 A 7/1987 Ozaki et al.
(Continued)

FOREIGN PATENT DOCUMENTS

CH SU 1110967 A 8/1984
WO WO 2013/155138 A1 10/2013

OTHER PUBLICATIONS

International Search Report for corresponding International Patent Application No. PCT/US2014/052298 mailed Feb. 5, 2015.

*Primary Examiner* — Colby M Hansen
(74) *Attorney, Agent, or Firm* — Merchant & Gould P.C.

(57) ABSTRACT

The present disclosure relates to a limited-slip clutch system and method. In one aspect, the limited-slip clutch actuation system can include a hydraulic pump operated by a variable speed drive wherein the pump can be configured to generate hydraulic flow in a hydraulic circuit including an actuation branch line that actuates a clutch. The circuit may also include a flow regulating valve for regulating a hydraulic fluid flow rate through the hydraulic circuit wherein the flow regulating valve can be configured to prevent the hydraulic fluid flow rate from exceeding a set maximum flow rate regardless of a magnitude of the hydraulic pressure in the hydraulic circuit. In operation, the pump speed can be controlled based on a command pressure set point and the measured pressure in the actuation branch line and to minimize operational costs by operating the pump at a transition region of the system pressure-pump speed curve.

7 Claims, 6 Drawing Sheets

Related U.S. Application Data

(60) Provisional application No. 61/869,270, filed on Aug. 23, 2013.

(56) References Cited

U.S. PATENT DOCUMENTS

| | | |
|---|---|---|
| 5,310,388 A | 5/1994 | Okcuoglu et al. |
| 6,733,411 B1 | 5/2004 | Kaplan et al. |
| 2006/0124428 A1 | 6/2006 | Baxter, Jr. |
| 2009/0233748 A1 | 9/2009 | Boddy |
| 2010/0043409 A1* | 2/2010 | Naydenov ........... F02D 41/3082 60/287 |

* cited by examiner

LIMITED-SLIP DRIVELINE APPARATUS

CROSS-REFERENCE TO RELATED APPLICATIONS

This application is a Continuation of PCT/US2014/052298 filed on Aug. 22, 2014, which claims benefit of U.S. Provisional Application No. 61/869,270 filed on Aug. 23, 2013, and which applications are incorporated herein by reference. To the extent appropriate, a claim of priority is made to each of the above disclosed applications.

TECHNICAL FIELD

The present disclosure relates generally to limited-slip driveline clutches. More particularly, the present disclosure relates to actuation arrangements for limited-slip driveline clutches.

BACKGROUND

Driveline clutches are used to selectively rotationally couple first and second rotatable driveline components. Limited-slip driveline clutches are driveline clutches that selectively couple first and second rotatable driveline components while concurrently permitting a limited/controlled amount of relative rotation between the first and second rotatable driveline components. One application for a limited-slip driveline clutch is in a differential where the driveline clutch is used to limit the rotational slip that can occur within the differential.

A differential is a component of an axle assembly that is used to transfer torque from a drive shaft to a pair of output shafts. The driveshaft drives the differential through the use of a bevel gear that meshes with a ring gear mounted to a housing of the differential. In automotive applications, a differential allows the tires mounted at either end of the axle assembly to rotate at different speeds. This is important when the vehicle is turning because the outer tire travels over an arc of greater distance than the inner tire. Thus, the outer tire must rotate at a faster speed than the inner tire to compensate for the greater distance of travel. The differential includes a gear arrangement that allows torque to be transferred from the driveshaft to the output shafts while concurrently allowing the output shafts to rotate at different speeds as needed.

While differentials are useful in cornering, they can allow vehicles to lose traction, for example, in snow or mud or other slick mediums. If either of the drive wheels loses traction, it will spin at a high rate of speed and the other wheel may not spin at all. To overcome this situation, limited-slip differentials have been developed to shift power from the wheel that has lost traction to the wheel that is not spinning.

Limited-slip differentials have been developed that use a hydraulically actuated clutch in fluid communication with a pump to limit differential rotation between the output shafts of the differential. Solenoid valves have been used to precisely control the actuation pressure provided to the clutch and generally require an electronic controller and valve control hardware/software. However, many such systems require the pump to operate either in conjunction with an accumulator and/or to operate at higher output levels than is often required at any given time during operation through the use of one or more fixed orifices. As such, these systems can be expensive to install and/or operate.

SUMMARY

A limited-slip clutch actuation system and method for controlling the actuation of a clutch in a limited-slip driveline apparatus are disclosed. In one aspect, the limited-slip clutch actuation system can include a hydraulic pump operated by a variable speed drive wherein the pump being configured to generate hydraulic flow in a hydraulic circuit including an actuation branch line that actuates a clutch. The circuit may also include a flow regulating valve for regulating a hydraulic fluid flow rate through the hydraulic circuit wherein the flow regulating valve is configured to prevent the hydraulic fluid flow rate from exceeding a set maximum flow rate regardless of a magnitude of the hydraulic pressure in the hydraulic circuit.

In one aspect, the hydraulic circuit can have a linear operating region within which the pressure in the actuation branch line is generally linear with the speed of the pump. The hydraulic circuit also can have a non-linear operating region within which the pressure in the actuation branch line is non-linear with the speed of the pump. A transition region may exist between the linear and non-linear operating regions.

An electronic control system can also be included having a controller configured to receive an input signal from a pressure sensor located in the actuation branch line and configured to send an output pump speed signal to the pump variable speed drive. The electronic control system can be configured to calculate the output pump speed signal based on the commanded pressure value and the input signal from the pressure sensor. The control system can also be configured to set the output pump speed signal to a speed that will place the hydraulic circuit within the transition region when the commanded pressure value corresponds to a pressure that would place the hydraulic circuit in the non-linear operating region.

In one step of the method, a hydraulic pump can be provided that is operated by a variable speed drive and configured to generate hydraulic flow in a hydraulic circuit including an actuation branch line that actuates the clutch. Another step in the method can be providing a flow regulating valve for regulating a hydraulic fluid flow rate through the hydraulic circuit, the flow regulating valve being configured to prevent the hydraulic fluid flow rate from exceeding a set maximum flow rate regardless of a magnitude of the hydraulic pressure in the hydraulic circuit. In another step, an electronic control system including a controller can be configured to receive an input signal from a pressure sensor located in the actuation branch line is provided and can be configured to send an output pump speed signal to the pump variable speed drive. In one step, a commanded pressure value and a pressure sensor input signal can be received at the controller. Another step can be calculating the output pump speed signal based on the commanded pressure value and the input signal from the pressure sensor, wherein the output pump speed signal is set to a speed that will place the hydraulic circuit within the transition region when the commanded pressure value corresponds to a pressure that would place the hydraulic circuit in the non-linear operating region. The output pump speed signal can then be sent to the variable speed drive.

A variety of additional aspects will be set forth in the description that follows. These aspects can relate to individual features and to combinations of features. It is to be understood that both the foregoing general description and the following detailed description are exemplary and

DETAILED DESCRIPTION

Reference will now be made in detail to exemplary aspects of the present disclosure that are illustrated in the accompanying drawings. Wherever possible, the same reference numbers will be used throughout the drawings to refer to the same or like structures.

Clutch Actuation System

The present disclosure relates generally to a method and system for controlling operation of a hydraulically actuated driveline clutch used to limit relative rotation between first and second rotatable driveline components (not shown). In one example, the method and system can involve directly regulating/controlling (e.g., limiting) a hydraulic fluid flow rate to limit the amount of rotational speed variance that is permitted between the first and second driveline components. While the hydraulic pressure within the system will vary as the flow rate is regulated, the pressure itself is preferably not specifically controlled in some applications. In such instances, pump speed/flow rate can be the controlled parameter of the system. It will be appreciated that the above-described control strategy based on pump speed/flow rate allows for differences in rotational speed between the first and second driveline components to be effectively controlled (e.g., limited) without requiring the use of additional expensive equipment, such as an accumulator system and without requiring the use of components having an associated high operational cost, such as one or more fixed orifices.

As disclosed herein in FIGS. 1-6, a limited-slip driveline apparatus 10 and method in accordance with the principles of the present disclosure is shown. It will be appreciated that while the limited-slip driveline apparatus 10 is applicable to any type of driveline apparatus having a clutch 70 for controlling relative rotation between two driveline components. As used herein, the term "clutch" means any structure that uses friction to control relative rotation between two components.

Figure 1:
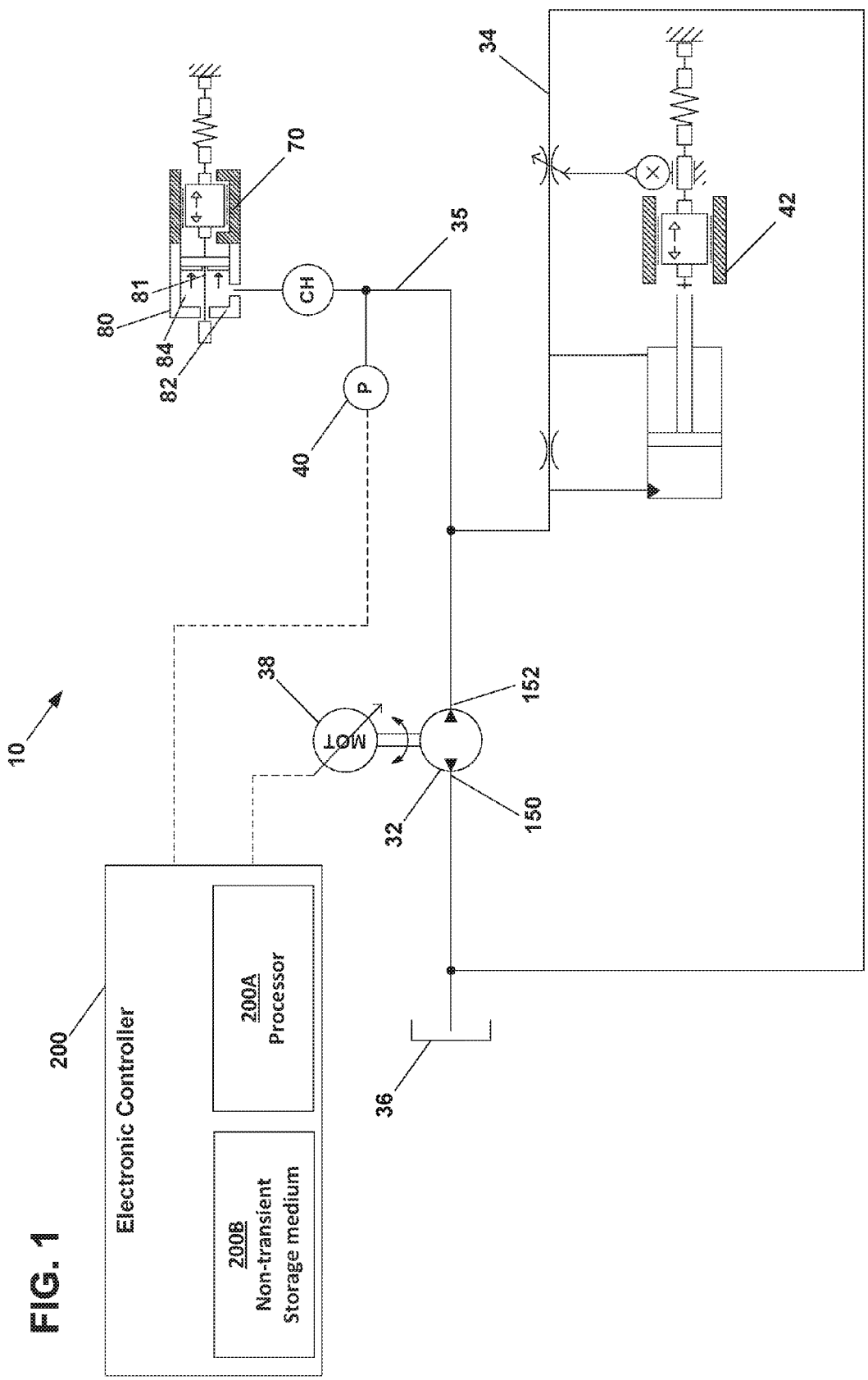
FIG. 1 is a schematic view of a limited-slip clutch actuation system in accordance with the principles of the present disclosure.

FIG. 1 schematically illustrates a limited-slip driveline apparatus 10 in accordance with the principles of the present disclosure. In one aspect, the limited-slip driveline apparatus 10 includes a clutch assembly 70 (shown in model form) that is actuated by an actuation arrangement 80. The limited-slip driveline apparatus 10 further includes a hydraulic fluid pump 32 that is in fluid communication with the actuation arrangement 80 via a actuation branch line 35 of a hydraulic actuation circuit 34. A flow regulating valve 42, discussed later, is also placed in the hydraulic actuation circuit 34. In operation, and as explained in further detail below, the hydraulic fluid pump 32 and flow regulating valve 42 can operate together to selectively engage the clutch assembly 70 via the actuation arrangement 80.

As shown, the actuation arrangement 80 can include a piston 81 mounted within a piston housing 82. A pressure chamber 84 can be defined between the piston 81 and the piston housing 82. The piston 81 can be moveable relative to the piston housing 82 along a longitudinal axis. When the hydraulic fluid pump 32 pumps hydraulic fluid through the hydraulic actuation circuit 34, the pressure chamber 84 is pressurized thereby causing the piston 81 to slide along its longitudinal axis toward the clutch pack. In one example, as the piston 81 is forced against the clutch pack by hydraulic pressure within the pressure chamber 84, friction plates and eared discs are compressed together such that the clutch 70 is actuated. Meaningful braking/actuation of the clutch 70 does not take place until the hydraulic pressure in the pressure chamber 84 reaches a predetermined level.

It will be appreciated that the limited-slip clutch apparatus 10 is configured to allow a limited amount of relative rotation between a differential and a first output shaft while preventing the relative rotation from exceeding a predetermined rate. In one example, the predetermined maximum amount of relative rotation permitted can be about 60 rotations per minute. This rate of relative rotation is suitable for allowing the wheels of a vehicle to rotate at different speeds for accommodating turning/cornering. Relative rotational speeds greater than the predetermined maximum rate of relative rotation would indicate that one of the wheels is slipping (e.g., on ice or other slippery medium) and spinning at a high speed and the other of the wheels has stopped or significantly slowed due to lack of torque. In the case where the second wheel slips and the first wheel stops, the hydraulic pump 32 and flow regulating valve work together to pump fluid through the actuation circuit 34 to actuate the clutch 70. In this situation, actuation of the clutch 70 causes increased torque to be transferred from the differential housing to the first output shaft thereby causing rotation of the first output shaft and a first wheel. In the case where the first wheel slips and the second wheel stops, the hydraulic pump 32 pump and flow regulating valve 42 operate to ensure that fluid through the actuation circuit 34 is sufficient to actuate the clutch 70. In this situation, actuation of the clutch 70 brakes or resists rotation of the first output shaft relative to the differential housing causing increased torque to be transferred through the differential housing and the torque transfer arrangement to the second output shaft thereby causing rotation of the second output shaft and the first wheel.

One example of a clutch and differential assembly with the aforementioned components is described in Patent Cooperation Treaty Patent Application Serial Number PCT/US13/35900 entitled "Limited-slip Driveline Apparatus," filed on Apr. 10, 2013. The entirety of PCT/US13/35900 is hereby incorporated by reference in its entirety.

Figure 3:
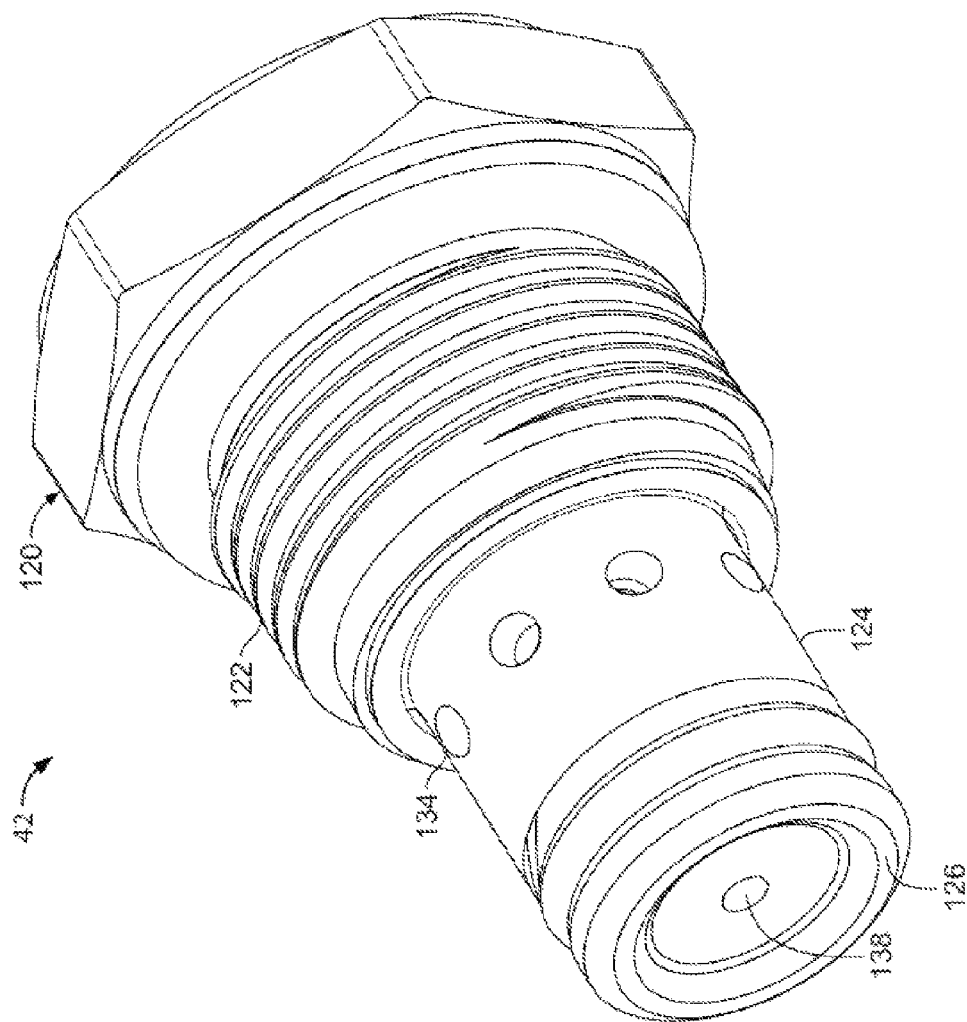
FIG. 3 is a perspective view of a pressure regulator shown in the limited-slip clutch actuation system of FIG. 1.
Figure 4:
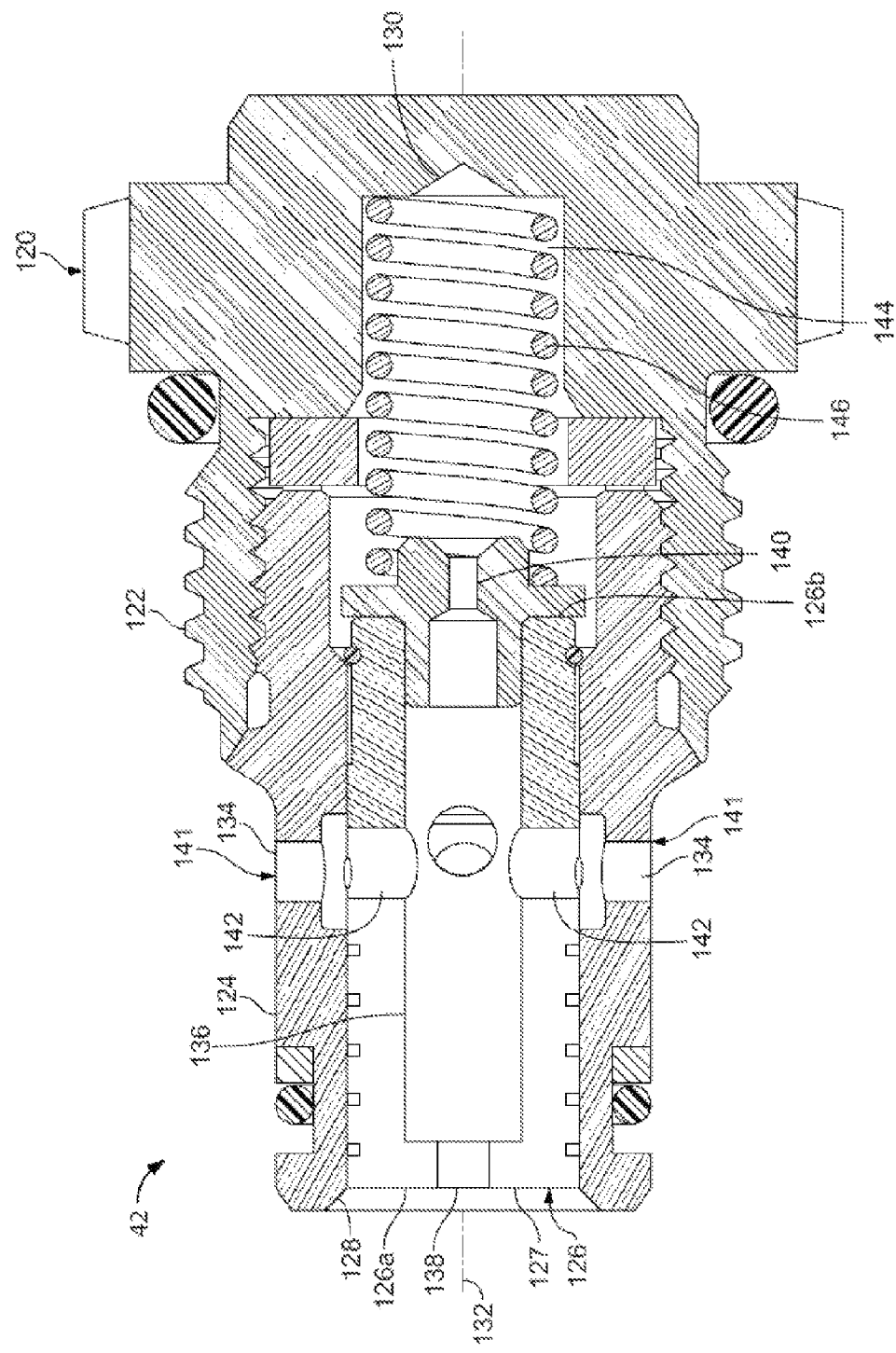
FIG. 4 is a cross-sectional side view of the pressure regulator shown in FIG. 3.

Referring to FIGS. 3 and 4, the flow regulating valve 42 includes an outer body 120 having exterior threads 122 that can be used, for example, for threading the flow regulating valve 42 into a valve mounting port. The outer body 120 also forms a valve sleeve 124 that receives a valve piston 126. The valve sleeve 124 can have an open end 128 positioned opposite from a closed end 130. The valve piston 126 can be slidably mounted within the valve sleeve 124 and configured to slide relative to the outer body 120 along an axis 132 defined by the valve sleeve 124. The valve sleeve 124 can define a plurality of outlet openings 134 at an intermediate location between the open and closed ends 128, 130. The outlet openings 134 can be circumferentially spaced about the axis 132. The valve piston 126 can define an inner passage 136 that extends lengthwise through the valve piston 126. An inlet opening 138 (e.g., a fixed size orifice) can be defined through one end 126*a* of the valve piston 126 and a pressure balancing vent 140 (e.g., a fixed size orifice) can be defined though the opposite end 126*b* of the valve piston 126. The end 126*a* defines a piston face 127 of the valve piston 126. The inlet opening 138 and the pressure balancing vent 140 are both shown in fluid communication with the passage 136.

The valve piston 126 also defines a plurality of outlet openings 142 positioned at an intermediate location along the length of the piston 126. The outlet openings 142 are circumferentially spaced about the axis 132 and are adapted to align with the outlet openings 134 of the valve sleeve 124 when the flow regulating valve 42 is in an open position. A spring chamber 144 can be defined between the valve piston 126 and the closed end 130 of the valve sleeve 124. The pressure balancing vent 140 ensures that inner passage 136 and the spring chamber 144 become pressure balanced over time. A spring 146 can be mounted in the chamber 144.

The inlet opening 138 of the valve piston 126 can define an inlet of the flow regulating valve 42 while the outlet openings 134, 142 can cooperate to define a variable size outlet orifice 141 of the flow regulating valve 42. The spring 146 biases the valve piston 126 to an open position (shown at FIG. 4) in which the outlet openings 134, 142 substantially align with one another such that the outlet orifice 141 defines an orifice size (i.e., a cross-sectional area through which fluid can pass) that is large enough to accommodate a flow rate up to a set maximum flow rate value of the valve 42 without causing an increase in pressure within the actuation circuit 34 that is significant enough to cause actuation of the clutch 70. The set maximum flow rate value is the maximum flow rate permitted by the valve regardless of the hydraulic circuit pressure. The set maximum flow rate value can also be referred to as an established or predetermined maximum flow rate value.

Once the flow passing through the flow regulating valve 42 reaches the set maximum flow rate of the flow regulating valve 42, the flow regulating valve 42 begins to regulate the flow so that the flow does not exceed the set maximum flow rate regardless of the hydraulic pressure upstream of the valve 42. The valve 42 regulates the flow rate by decreasing the orifice size 141 in a controlled manner. When the valve 42 begins regulating the flow to prevent the set maximum flow rate from being exceeded, the hydraulic pressure within the hydraulic actuation circuit 34 upstream of the valve 42 reaches a level that is high enough to cause meaningful actuation of the clutch 70. It will be appreciated that the magnitude of braking force provided by the clutch 70 is directly related to and dependent upon the level of pressure in the hydraulic actuation circuit 34.

As the valve piston 126 is moved toward a closed position (i.e., a position in which the variable size orifice 141 is closed), the spring 146 applies a spring force to the valve piston 126 that resists movement of the valve piston 126 toward the closed position. The valve piston 126 moves toward the closed position as the valve piston 126 moves toward the closed end 130 of the sleeve 124. The size of the orifice 141 decreases as the valve piston 126 moved from the open position toward the closed position. In one example, the spring 146 can apply a progressively increasing resistive spring load to the valve piston 126 as the valve piston 126 moves toward the closed position and the spring 146 is compressed. Thus, in such an example, the closer the valve piston 126 gets to the closed position, the more the spring resists movement of the valve piston 126 toward the closed position.

Flow regulation occurs when hydraulic pressure within the system upstream of the inlet opening 138 applies pressure to the piston face 127 and forces the valve piston 126 toward the closed position against the bias of the spring 146 so as to reduce the size of the variable orifice 141. To prevent the flow rate of the hydraulic circuit 34 from exceeding the maximum flow rate of the valve 42 regardless the pressure upstream of the inlet opening 138, the valve 42 controls the size of the orifice 142. In one example, during flow regulation, the valve piston 126 oscillates back and forth along the axis 132 thereby repeatedly increasing and decreasing the size of the outlet orifice 141 in a controlled manner so as to limit the flow through the valve 42 to the set maximum flow rate of the valve. The movement of the valve piston 126 is controlled by the spring force of the spring 146 combined with a hydraulic pressure force caused by hydraulic fluid pressure applied to the piston face 127 of the valve piston 126 as well as a hydraulic pressure force generated by hydraulic pressure in the spring chamber 144. The spring 146 cooperates with the hydraulic pressure in the spring chamber 144 to force the valve piston 126 toward the open position. It will be appreciated that pressure compensated flow regulating valves can have a variety of different configurations. The depicted flow regulating valve 42 is but one example of a flow regulating valve that could be used, and other valve configurations suitable for limiting flow to a certain flow rate regardless of hydraulic circuit pressure can also be used.

When the first and second output shafts mounted within the differential are caused to rotate at different rates, relative rotation is generated between the first output shaft and the differential housing. This relative rotation generates a signal to the controller 200, discussed later, which in turn generates a signal to engage the clutch 70. Accordingly, hydraulic fluid pump 32 draws hydraulic fluid from the reservoir 36 through the input port 38 and into the inlet 150 of the hydraulic fluid pump 32. The hydraulic fluid then flows through the hydraulic fluid pump 32 and is discharged from the outlet 152 of the hydraulic fluid pump 32 toward the pressure chamber 84. The fluid flow within the hydraulic circuit 34 flow then proceeds from the pressure chamber 84 to the flow regulating valve 42. The flow enters the flow regulating valve 42 through the inlet port 38 and exits through the outlet orifice 141. As long as the flow rate is below the set maximum flow rate of the flow regulating valve 42, the spring 146 retains the flow regulating valve 42 in the full open position and flow proceeds unregulated through the outlet orifice 141 and back to the reservoir 36 through the outlet port 40. In this situation, the hydraulic pressure upstream of the flow regulating valve 42 (i.e., the hydraulic pressure provided at the pressure chamber 84) is sufficiently low that no meaningful actuation of the clutch 70 occurs.

When the flow rate generated by the hydraulic fluid pump 32 reaches the set maximum flow rate of the flow regulating valve 42, the flow regulating valve 42 begins to regulate flow by varying the size of the orifice 141 so that the flow passing through the flow regulating valve 42 does not exceed the set maximum flow rate regardless of the pressure within the circuit 34. When the flow regulating valve 42 regulates flow by restricting the outlet orifice 141, the hydraulic pressure within the hydraulic actuating circuit 34 upstream of the valve 42 increases thereby increasing the force supplied by the piston 81 to the clutch 70 to a level where meaningful actuation/braking occurs. In this way, the increased hydraulic pressure provides an increased braking action that prevents the relative rotational speed between the first output shaft and the differential housing from exceeding a predetermined value corresponding to the set maximum flow rate of the flow regulating valve 42. In one example, the set maximum flow rate passing through the flow regulating valve 42 equals 0.25 gallons per minute and the maximum relative rotational speed between the first output shaft and the differential housing is 60 rotations per minute.

Control System

Figure 2:
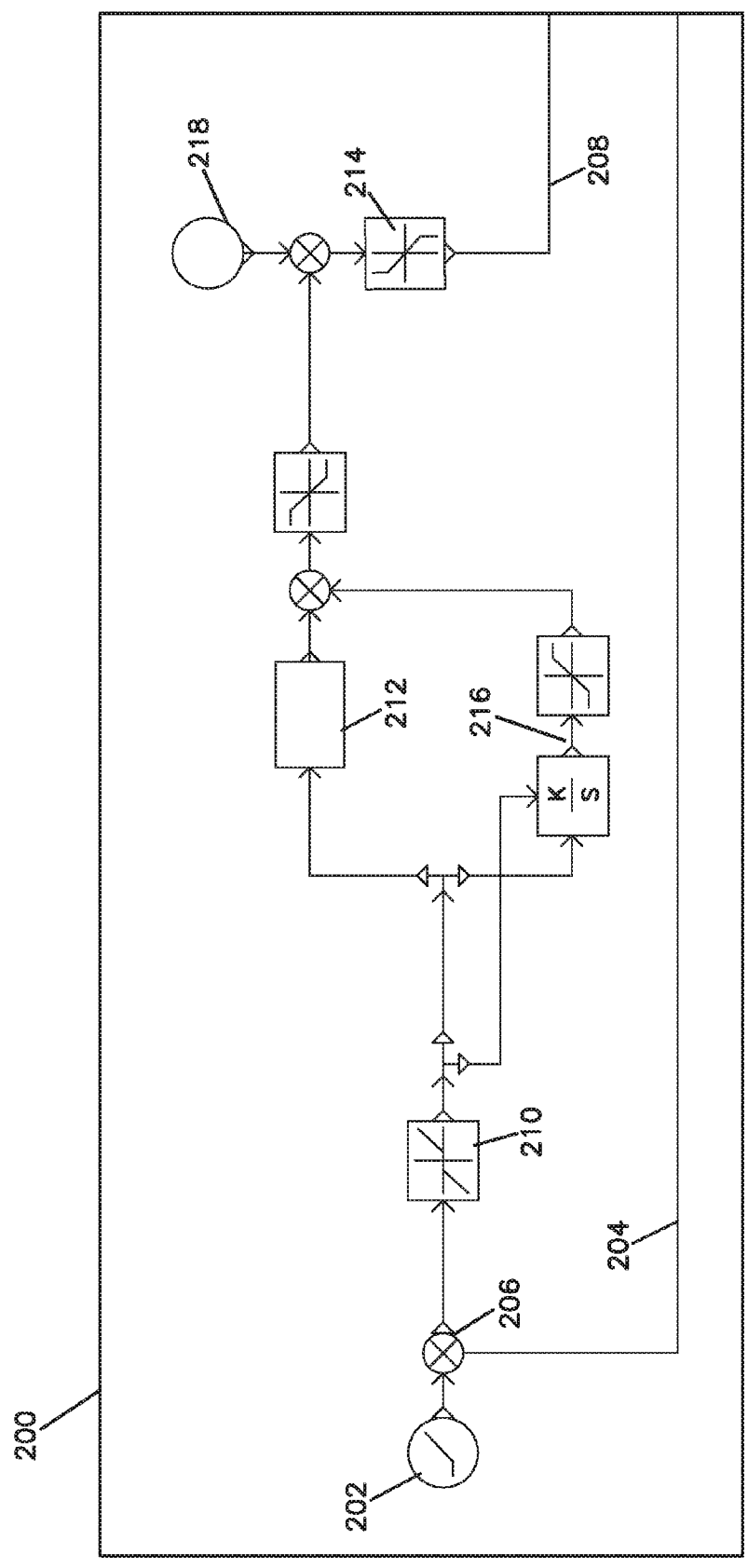
FIG. 2 is a schematic view of a portion of the control system of the limited-slip clutch actuation system of FIG. 1.

Referring to FIGS. 1 and 2, the limited-slip clutch actuation system 10 includes an electronic controller 200. The electronic controller 200 is schematically shown as including a processor 200A and a non-transient storage medium or memory 200B, such as RAM, flash drive or a hard drive. Memory 200B is for storing executable code, the operating parameters, and the input from the operator user interface 52 while processor 200A is for executing the code. The controller 200 can be configured to communicate data and/or instructions (e.g. inputs, outputs, set points, etc.) with other portions of the vehicle operating system, for example via a control area network (CAN).

The electronic controller 200 typically includes at least some form of memory 200B. Examples of memory 200B include computer readable media. Computer readable media includes any available media that can be accessed by the processor 200A. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the processor 200A.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

Electronic controller 200 is also shown as having a number of inputs and outputs that may be used for implementing the operation of the limited-slip clutch actuation system 10. For example, the electronic controller 200 receives an input from a pressure sensor 40 in the actuation branch line. Additionally, the electronic controller 200 receives a pressure set point for the pressure sensor 40. The pressure set point can be received from the vehicle control area network (CAN) or can be a setting within the controller 200. The controller 200 is also configured to generate and send an output pump speed signal to a variable speed drive 38 coupled to the pump 32. As explained further in the following section, the controller 200 may include a variety of motor speed control logic elements (shown at FIG. 2) that can be utilized to perform various process steps during operation of the limited-slip clutch actuation system 10.

System Curve

Figure 5:
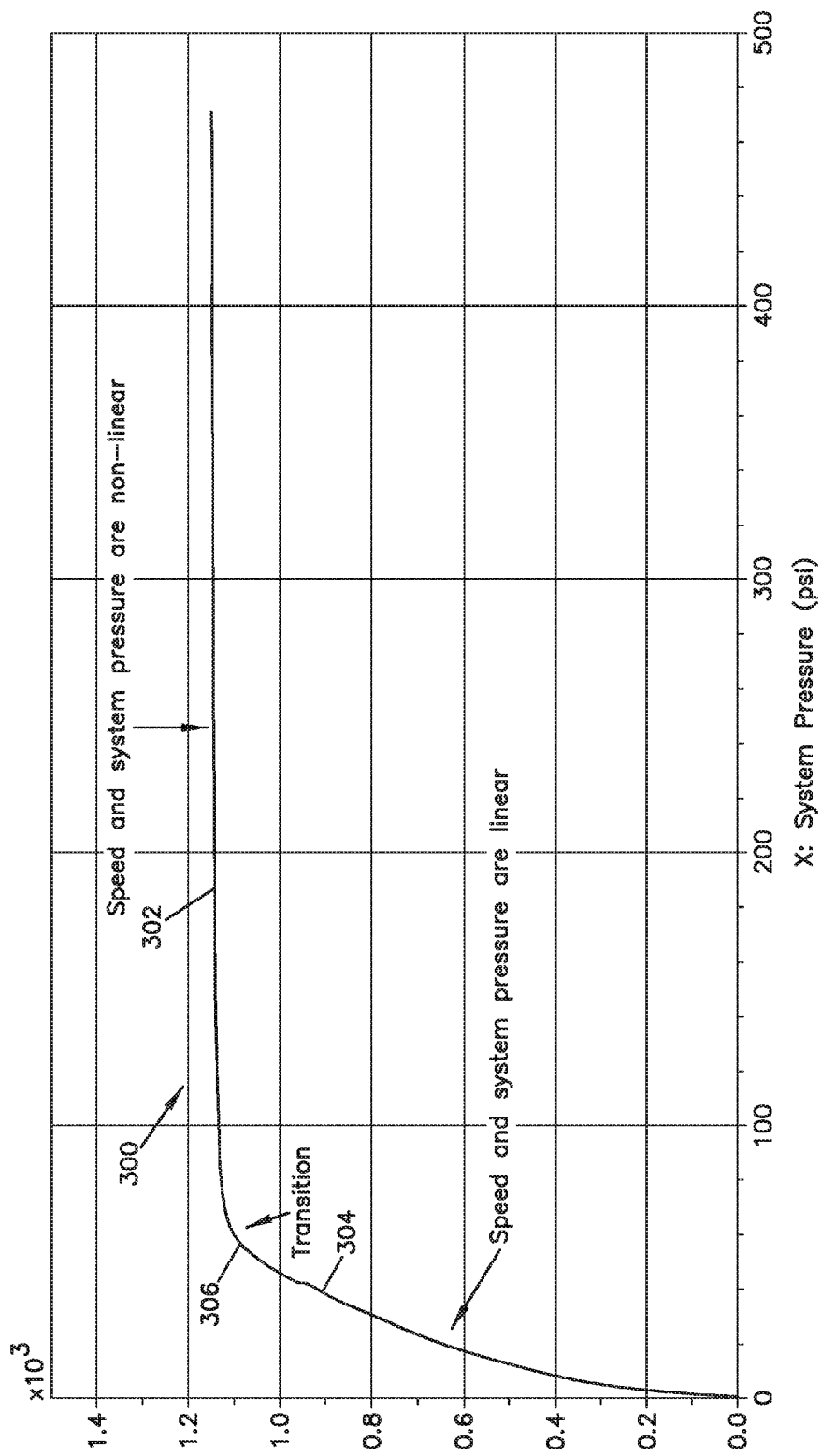
FIG. 5 is a graphical depiction of a hydraulic system operating curve of the limited-slip clutch actuation system of FIG. 1.

Referring to FIG. 5, a system operating curve 300 of the hydraulic circuit 34 is presented that shows the general relationship between the speed of the pump 32 and the pressure within the hydraulic circuit 34, including the actuation branch line 35 and as determined by the flow regulating valve 42.

In one aspect, the system curve 300 can be characterized as having three operational zones or regions. In a first zone 302, a non-linear operating region is defined within which the pressure in the actuation branch line 35 is non-linear with the speed of the pump. In this region, the pump speed has very little effect on the system pressure due primarily to the operation of the flow regulating valve 42. As can be seen, the first zone 302 generally exists at pump speeds above about 1,100 rpm (system pressures above about 80 psi) for the example shown. In a second zone 304, a region is defined wherein the pressure in the actuation branch line 35 is significantly affected by the speed of the pump 32. The second zone 304 can be characterized as a generally linear operating region, at least with respect to the first zone 302. In the example shown, the second zone 304 exists at a pump speed between about 0 and 1000 rpm (revolutions per minute) and a system pressure of between about 0 and 60 psi (pounds per square inch). A third zone 306 can be defined as the general area along the system curve 300 where the first zone 302 transitions into the second zone 304. In the example shown, the transition area of the third zone 306 generally occurs at pump speeds between about 1000 rpm and about 1100 rpm. As the pump pressure stabilizes in the first zone 302 generally independently of the system flow (i.e. pump speed), it can be advantageous to control the speed of the pump at or near the speed defined by the third zone 306 to reduce energy consumption costs of the pump 32. For example, an energy reduction can be realized by controlling the pump speed, in the exemplary system presented herein, between about 1050 rpm and about 1150 rpm.

Method of Operation

Figure 6:
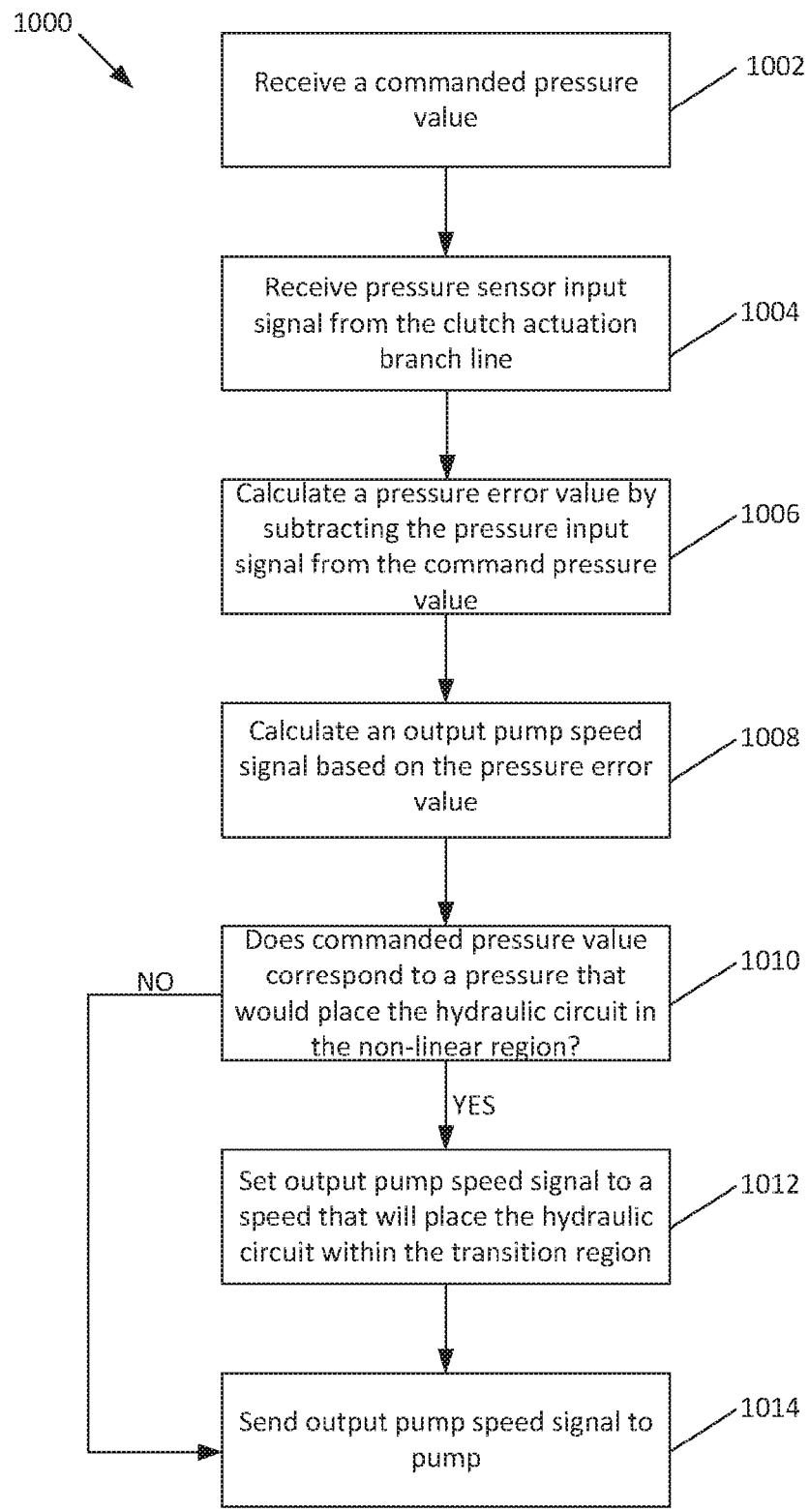
FIG. 6 shows a process flow chart for operating the limited-slip clutch actuation system of FIG. 1.

Referring to FIG. 6, a first process 1000 for controlling the actuation of a clutch in a limited-slip driveline apparatus 10 is described. In one aspect, the first process 1000 reduces pump energy consumption by not operating the pump at a higher speed than required during certain operational conditions, as explained below. It is noted that FIG. 2 shows various motor speed control logic elements of the controller 200 that may be used in implementing the first process 1000.

In one step of the method 1002, a commanded pressure value 202 can be received at the controller 200. In another step 1004, a pressure input signal 204 from the clutch actuation branch line pressure sensor 40 can be received at the controller 200. At a step 1006, a pressure error value 206 can be calculated by subtracting the pressure input signal 204 from the commanded pressure value 202. In a step 1008, an output pump speed signal 208 can be calculated that is based on the commanded pressure value 202 and the input signal 204 from the pressure sensor 40. Referring to FIG. 2, step 1008 can also include passing the pressure error value through a dead band filter 210, utilizing a proportional-derivative control algorithm 212, limiting the pump output speed signal based on motor speed saturation limits 214, using a rest integrator controller 216, and utilizing a feed forward motor speed command 218.

At a step 1010, it can be determined whether the commanded pressure value 202 corresponds to a pressure that would place the hydraulic in the non-linear region 302 on the system curve 300. If not, the output speed signal can be outputted to the pump 32 at a step 1014. If so, the output pump speed signal can be set to a speed at or near a speed that can be defined within the third zone 306 or transition region of the system curve 300 before the output speed signal is sent to the pump at step 1014.

The above specification provides examples of how certain inventive aspects may be put into practice. It will be appreciated that the inventive aspects can be practiced in other ways than those specifically shown and described herein without departing from the spirit and scope of the inventive aspects of the present disclosure.

What is claimed is:

1. A method for controlling the actuation of a clutch in a limited-slip driveline apparatus, the method including the steps of:
    a. providing a hydraulic pump operated by a variable speed drive, the pump being configured to generate hydraulic flow in a hydraulic circuit including an actuation branch line that actuates the clutch; and
    b. providing a flow regulating valve for regulating a hydraulic fluid flow rate through the hydraulic circuit, the flow regulating valve including a variable-size outlet orifice being configured to prevent the hydraulic fluid flow rate from exceeding a predetermined maximum flow rate regardless of a magnitude of the hydraulic pressure in the hydraulic circuit upstream of the flow regulating valve;
    c. providing an electronic control system including a controller configured to receive an input signal from a pressure sensor located in the actuation branch line and configured to send an output pump speed signal to the pump variable speed drive;
    d. the hydraulic circuit having:
        i. a first operating region;
        ii. a second operating region within which, in comparison to the first operating region, the pump speed is higher and the pressure in the actuation branch line is both greater and less linear with the speed of the pump; and
        iii. a transition region between the first and second operating regions;
    e. receiving a commanded pressure value and the pressure sensor input signal at the controller;
    f. calculating the output pump speed signal based on the commanded pressure value and the input signal from the pressure sensor, wherein the output pump speed signal is set to a speed that will place the hydraulic circuit within the transition region when the commanded pressure value would place the hydraulic circuit in the second operating region; and
    g. sending the output pump speed signal to the variable speed drive.

2. The method for controlling the actuation of a clutch of claim 1, wherein the transition region includes pump speeds in the range from 1050 rpm to 1150 rpm.

3. The method for controlling the actuation of a clutch of claim 1, wherein the step of calculating the pump output speed signal includes subtracting the pressure sensor input signal from the commanded pressure value to create a pressure error value.

4. The method for controlling the actuation of a clutch of claim 1, wherein the variable-sized outlet orifice of the flow regulating valve is formed by a plurality of first openings in a valve sleeve and a plurality of second openings in a valve piston that is spring-biased toward an open position within the valve sleeve.

5. A limited-slip clutch actuation system comprising:
    a. a hydraulic pump operated by a variable speed drive, the pump being configured to generate hydraulic flow in a hydraulic circuit including an actuation branch line that actuates a clutch; and
    b. a flow regulating valve for regulating a hydraulic fluid flow rate through the hydraulic circuit, the flow regulating valve including a variable-size outlet orifice being configured to prevent the hydraulic fluid flow rate from exceeding a predetermined maximum flow rate regardless of a magnitude of the hydraulic pressure in the hydraulic circuit upstream of the flow regulating valve;
    c. the hydraulic circuit having:
        i. a first operating region;
        ii. a second operating region within which, in comparison to the first operating region, the pump speed is higher and the pressure in the actuation branch line is both greater and less linear with the speed of the pump; and
        iii. a transition region between the first and second operating regions;
    d. an electronic control system including a controller configured to receive an input signal from a pressure sensor located in the actuation branch line and configured to send an output pump speed signal to the pump variable speed drive, the electronic control system being configured to calculate the output pump speed signal based on a commanded pressure value and the input signal from the pressure sensor, and configured to set the output pump speed signal to a speed that will place the hydraulic circuit within the transition region when the commanded pressure value corresponds to a pressure that would place the hydraulic circuit in the non-linear operating region.

6. The limited-slip clutch actuation system of claim 5, wherein the transition region includes pump speeds in the range from 1050 rpm to 1150 rpm.

7. The limited-slip clutch actuation system of claim 5, wherein the commanded pressure value is set to 400 psi.

* * * * *